United States Patent
Oldak

(10) Patent No.: US 6,705,822 B2
(45) Date of Patent: Mar. 16, 2004

(54) LOADER FOR MOUNTING A KAYAK OR SIMILAR LOAD ONTO THE ROOF OF AN AUTOMOBILE

(76) Inventor: Lee S. Oldak, 22 Carlisle La., Sag Harbor, NY (US) 11963

( * ) Notice: Subject to any disclaimer, the term of this patent is extended or adjusted under 35 U.S.C. 154(b) by 97 days.

(21) Appl. No.: 10/015,335

(22) Filed: Dec. 12, 2001

(65) Prior Publication Data

US 2003/0108410 A1 Jun. 12, 2003

(51) Int. Cl.$^7$ ................................................ B60R 9/042
(52) U.S. Cl. .................... 414/532; 224/310; 224/322; 414/462
(58) Field of Search ................................ 224/309, 310, 224/322, 324; 414/462, 532

(56) References Cited

U.S. PATENT DOCUMENTS

| 2,247,128 | A | * | 6/1941 | Levey | 414/532 |
|---|---|---|---|---|---|
| 3,001,679 | A | * | 9/1961 | Canning et al. | 224/324 |
| 3,170,583 | A | * | 2/1965 | Meyer | 414/462 |
| 3,712,524 | A | * | 1/1973 | Ames, Sr. | 224/310 |
| 4,003,485 | A | * | 1/1977 | Edgerton | 414/462 |
| 4,193,729 | A | * | 3/1980 | Winfield | 414/532 |
| 4,531,879 | A | * | 7/1985 | Horowitz | 414/462 |
| 5,292,045 | A | * | 3/1994 | Mandel | 224/309 |
| 5,535,929 | A | * | 7/1996 | Neill | 224/310 |
| 5,951,231 | A | * | 9/1999 | Allen | 414/462 |
| 5,957,350 | A | * | 9/1999 | Giles | 224/310 |
| 6,164,507 | A | * | 12/2000 | Dean et al. | 224/324 |

* cited by examiner

Primary Examiner—Janice L. Krizek
(74) Attorney, Agent, or Firm—Charles E. Baxley

(57) ABSTRACT

A loader for mounting an elongated load onto the roof an automobile includes an axle, a pair of wheels mounted on the ends of the axle, an elongated stabilizer bar, a pair of tie-down straps and a pair of vacuum cups. The stabilizer bar is centrally mounted on the axle and the tie-down straps are mounted on the axle between the stabilizer bar and the wheels. During use, the vacuum cups are attached to the rear windshield of an automobile, the end of the stabilizer bar bears against the rear windshield and the tie-down straps are attached to a convenient portion of the automobile. The front portion of the load is placed on the wheels and the back of the load is lifted and the load is rolled onto the roof of the automobile.

12 Claims, 5 Drawing Sheets

LOADER FOR MOUNTING A KAYAK OR SIMILAR LOAD ONTO THE ROOF OF AN AUTOMOBILE

FIELD OF THE INVENTION

The present invention relates generally to the field of loaders for automobiles and more particularly to a loader for mounting a kayak or similar load onto the roof of an automobile.

BACKGROUND OF THE INVENTION

The prior art related to loaders for automobiles includes the following U.S. Patents.

U.S. Pat. No. 2,247,128 to A. M. Levey shows a boat and luggage carrier which includes an arch-shaped frame or bracket which supports a track and a supporting member. The frame is of extended length and has an end which is attached to the rear bumper of an automobile. The track has a curved portion which projects upwardly from the bumper and a straight portion which projects toward the front of the automobile. The forward end of the track is attached to the front bumper of the automobile by a strap. A plurality of rollers are attached to the track at fixed intervals to facilitate positioning a boat or a luggage box on the roof of the automobile.

U.S. Pat. No. 3,712,524 to Ames, Sr. shows a boat loader for automobiles which includes a roller which is supported by a pair of A-frame supports on the trunk lid of an automobile. The supports space the roller a substantial distance above the trunk lid to facilitate rolling a boat onto a rooftop carrier.

U.S. Pat. No. 4,003,485 to Edgerton shows a vehicle-top loader which includes a carriage which rests on a vehicle-top rack. For loading and unloading the carriage is moved across the track and pivoted downward to a slanted position alongside the vehicle. An extendable lever is used to aid in lifting the loaded carrier to vehicle-top height.

U.S. Pat. No. 4,531,879 to Horowitz shows a boat loading and carrying device which includes a base attached to the roof of a car. A rack is pivotally attached to the rack so that the rack can pivot between an inclined surface wherein the rack is angled downwardly and rearwardly from the roof of the automobile for loading and unloading to a loaded position parallel to the roof of the automobile. The boat is pulled onto the rack by a rope and winch system.

U.S. Pat. No. 5,535,929 to Neil shows a tip-off luggage carrier apparatus which includes a storage shell which is attached by struts and wheels to a shell. The shell can be moved from a carrier position atop a vehicle to a loading position adjacent the vehicle and to a position completely removed from the vehicle.

U.S. Pat. No. 5,957,350 to Giles shows a kayak loading device employing guiding rollers and a roof rack attachment mechanism. The device incorporates a plurality of rollers which are oriented in a "V" configuration by rigid struts attached to a crossmember. Padded feet extend downwardly from the crossmember. An attachment mechanism extends forward from the crossmember to attach the crossmember to a vehicle roof rack crossbar.

Despite the developments of the prior art there remains a need for a loader for mounting a kayak or similar load onto a roof of an automobile which is compact and can be easily stored in the trunk of an automobile and which can be easily mounted on and removed from an automobile.

OBJECTS AND SUMMARY OF THE INVENTION

It is an object of the present invention to provide a loader for mounting a kayak or similar load onto the roof of an automobile which can be quickly and easily mounted on and removed from an automobile.

Another object of the present invention is to provide a loader apparatus which can be easily stored in the trunk of an automobile.

Another object of the present invention is to provide a loader apparatus which is capable of reliable long term operation.

Yet another object of the present invention is to provide a loader which comprises a relatively small number of components which can be manufactured economically in volume resulting in a relatively low unit cost.

The foregoing and other objects and advantages of the present invention will appear more clearly hereinafter.

In accordance with the present invention there is provided a loader for mounting a kayak or similar load onto the roof of an automobile which includes an axle, a pair of wheels mounted on the end of the axle, an elongated stabilizer bar, a pair of tie-down straps and a pair of vacuum cups. The stabilizer bar is centrally mounted on the axle and the tie-down straps are mounted on the axle between the stabilizer bar and the wheels.

During use, the vacuum cups are attached to the rear windshield of an automobile, the end of the stabilizer bar bears against the rear windshield and the tie-down straps re attached to a convenient portion of the automobile. The bow of a kayak is placed on the wheels and the stem of the kayak is easily rolled onto the roof of the automobile.

Alternatively, the kayak can be mounted onto the roof of the automobile by mounting the vacuum cups on the hood of the automobile with the stabilizer bar bearing against the hood of the automobile. The ends of tie-down straps are attached to the front bumper of the automobile. The bow of the kayak is placed on the wheels and easily rolled onto the roof of the automobile.

DESCRIPTION OF THE DRAWINGS

Other important objects and advantages of the invention will be apparent from the following detailed description, taken in connection with the accompanying drawings, in which.

DETAILED DESCRIPTION OF THE INVENTION

Figure 1:
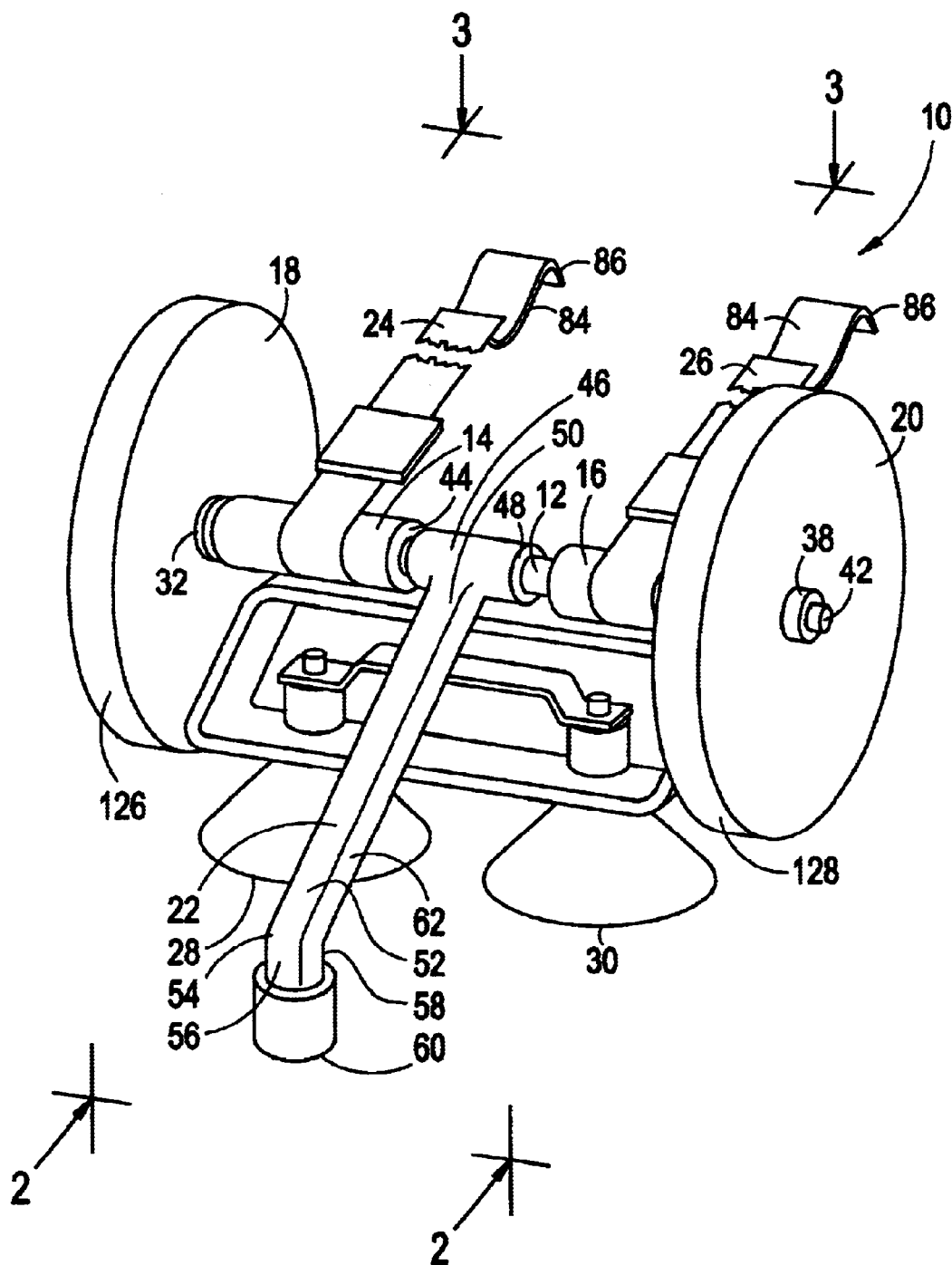
FIG. 1 is an overall perspective view of a loader for mounting a kayak or similar load onto the roof of an automobile in accordance with the present invention.
Figure 2:
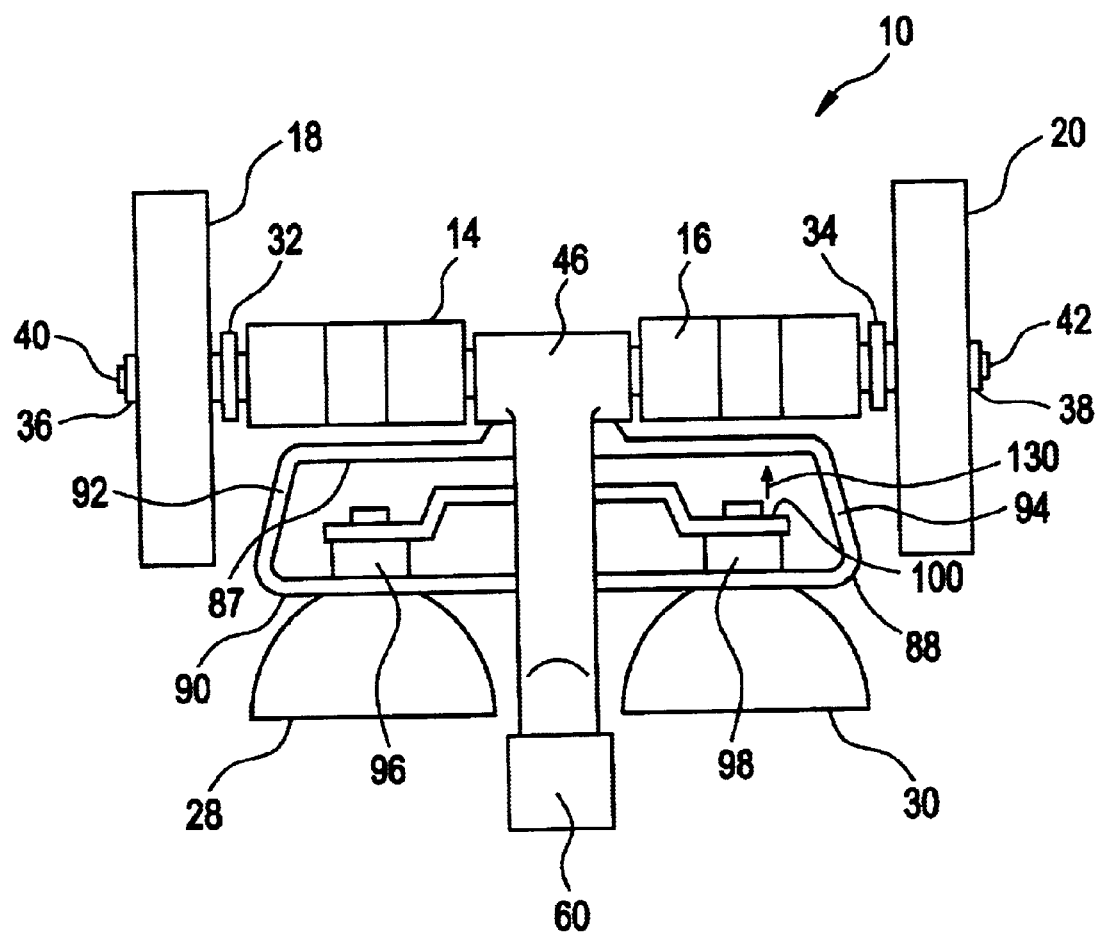
FIG. 2 is a side elevational view of the loader of FIG. 1 taken along the line 2—2 of FIG. 1.
Figure 3:
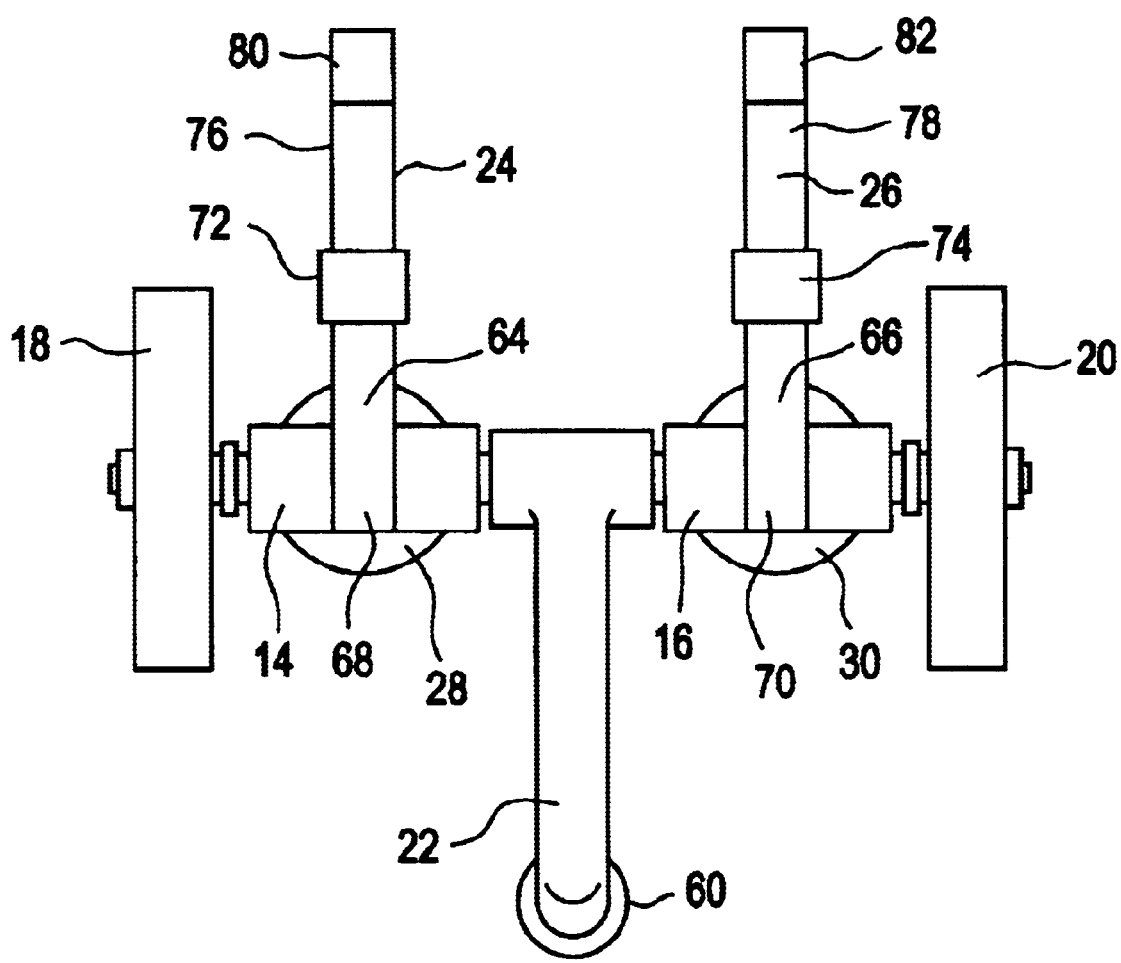
FIG. 3 is a top plan view of the loader of FIG. 1 taken along the line 3—3 of FIG. 1.

With reference to the drawings, wherein like reference numbers designate like or corresponding parts throughout, there is shown in FIGS. 1–5, a loader for mounting a kayak or similar load onto the roof of an automobile 10, made in accordance with the present invention, which includes an axle 12, a pair of spacers 14,16, a pair of wheels 18,20, a stabilizer bar 22, a pair of tie-down straps 24,26 and a pair of vacuum cups 28,30. As is shown in FIG. 2 washers 32,34 are mounted on the axles 12 between the wheels 18,20 and the spacers 14,16 and lock nuts 36,38 which are preferably nylon. Lock nuts retain the wheels 18,20 on the ends 40,42 of the axle 12. The spacers 14,16 are hollow tubes preferably made of plastic with the axle 12 passing through the central bores. The spacers 14,16 may be covered by a layer of foam 44 to prevent marring the load. The spacers 14,16 maintain the central position of the stabilizing block 46 which is mounted on the axle 12 via a clearance hole 48. The stabilizer bar 22 is of extended length and has a first end 50 mounted on the stabilizer block 46. An intermediate portion 52 of the stabilizer bar 22 has a bend 54 forming a downwardly directed segment 56 of the stabilizer bar 22. The second end 58 of the stabilizer bar 22 has a rubber bumper 60 mounted thereon which prevents marring the surface of an automobile in a manner which will be presently described. The segment 56 and the first portion 62 of the stabilizer bar 22 form an obtuse angle. As is shown in FIG. 3 the first ends 64,66 which are mounted one each on the spacers 14,16 via loops 68,70 formed on the tie-down straps 24,26. Each of the tie-down straps 24,26 has an adjustable cam buckle 72,74 for length adjustment and the ends 76,78 of each of the tie-down straps 24,26 has a mounting clip 80,82 for attachment to an automobile in a manner which will be presently described. The clips 80,82 each have angularly disposed portions 84,86.

The stabilizer block 46 is mounted on the top portion 87 of the frame 88 which includes a bottom portion 90 and a pair of spaced apart side portions 92,94. The vacuum cups 28,30 are mounted on the bottom portion 90 of the frame 88. Central portions 96,98 of the vacuum cups 28,30 are connected by an operating bar 100. Details of construction of vacuum cups 28,30 and the operating bar 100 are conventional in nature and are generally similar to vacuum cup handles used in the glazing industry for handling large panes of glass. Pressure on the operating bar 100 facilitates the easy attachment and, when desired, removal of the apparatus according to the present invention from the surface of an automobile.

Figure 4A:
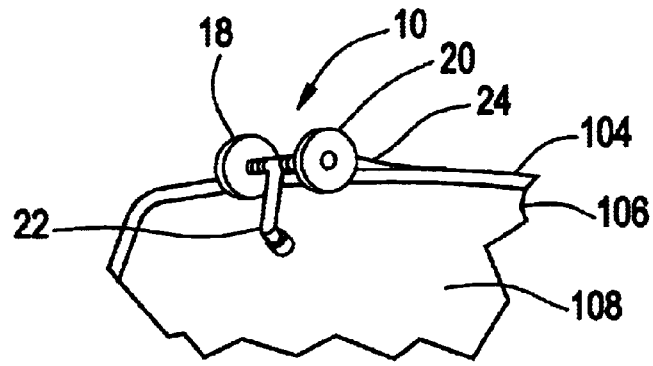
FIGS. 4A–4C are fragmentary schematic perspective views showing the process of using the loader of FIG. 1 to mount a kayak onto the roof of an automobile from the rear of the automobile.
Figure 4B:
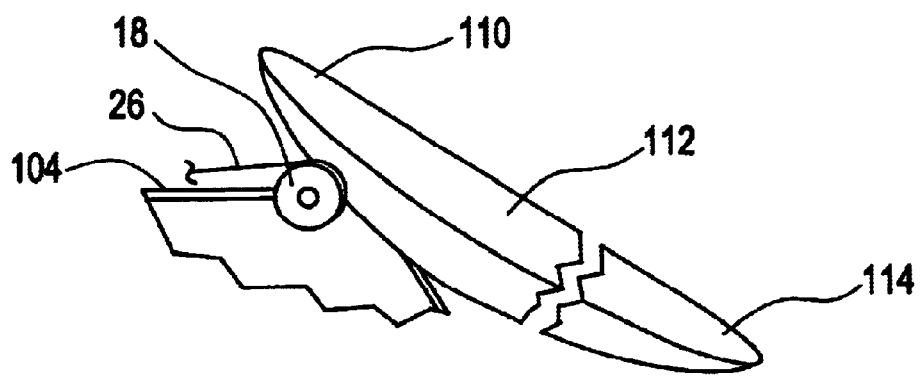
Figure 4C:
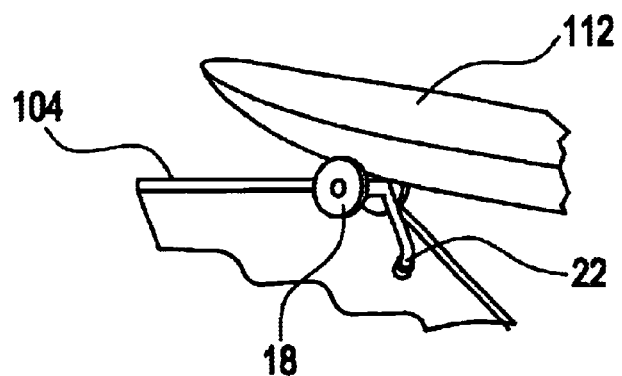

FIGS. 4A–4C show the process of using the loader 10, according to the present invention, to mount a kayak 102 onto the roof 104 of an automobile 106 from the rear of the automobile 106. FIG. 4A shows the attachment of the loader 10 to the automobile 106.

In FIG. 4A the vacuum cups 28,30 are attached to the rear windshield 108, the bumper 60 on the stabilizer bar 22 bears against the rear windshield 108 and the tie-down straps 24,26 are used to attach the loader 10 to the door frame(not illustrated). The cam buckles 72,74 are used to tighten the tie-down straps 24,26.

As is shown in FIG. 4B the bow 110 of the kayak 112 is placed between the wheels 18,20. The back or stem 114 of the kayak 112 is lifted and the kayak 112 is rolled upward onto the roof 104 as is shown in FIG. 4C.

Figure 5A:
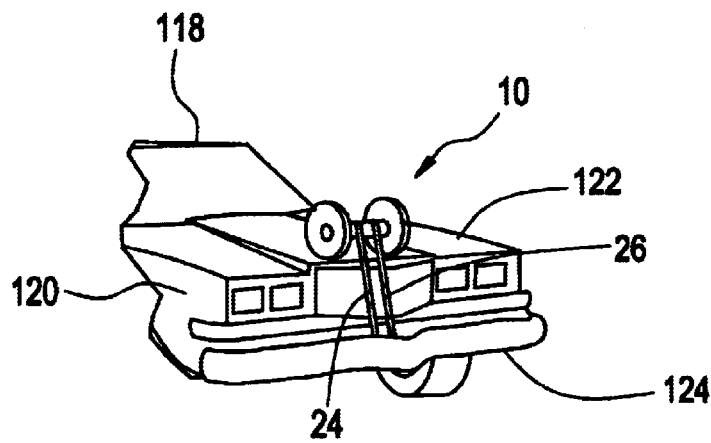
FIGS. 5A–5C are fragmentary schematic perspective views showing the process of using the loader of FIG. 1 to mount a kayak onto the roof of an automobile from the front of an automobile.
Figure 5B:
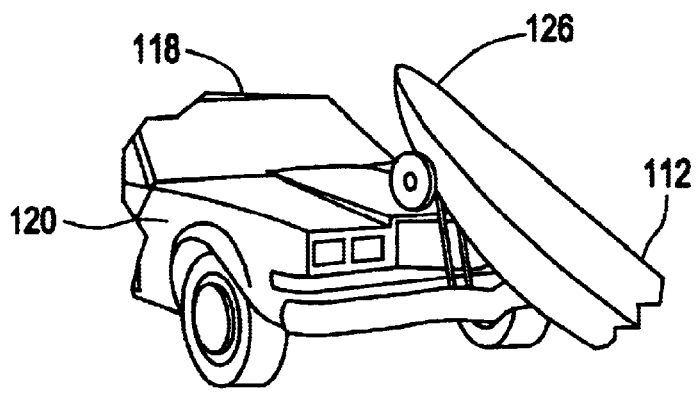
Figure 5C:
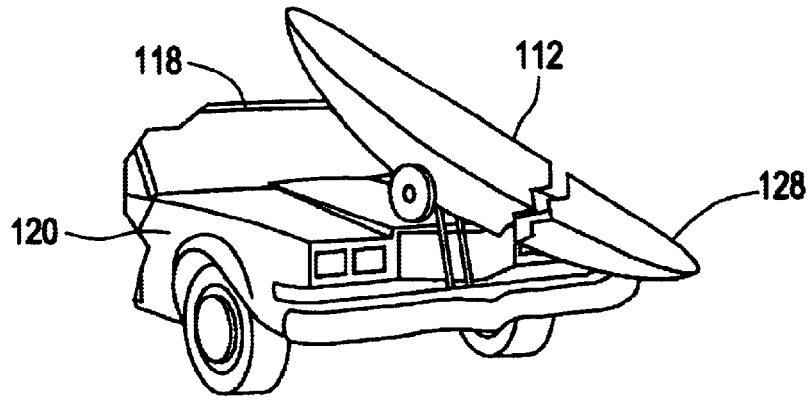

FIGS. 5A–5C show the process of using the loader 10 according to the present invention to mount a kayak 112 onto the roof 110 of an automobile 120 from the front of the automobile 120. FIG. 5A shows the attachment of the loader 10 to the hood 122 of the automobile 120. In FIG. 5A, the vacuum cups 28,30 are attached to the hood 122 of the automobile 120. The bumper 60 on the stabilizer bar 22 bears against the hood 122 of the automobile, and the tie-down straps 24,26 are used to attach the loader 10 to the front bumper 124 of the automobile 120.

As is shown in FIG. 5B, the bow 126 of the kayak 112 is lifted and placed on the wheels 18,20. The back or stem 128 of the kayak 112 is lifted and the kayak 112 is rolled upward onto the roof 110 as is shown in FIG. 5C.

As is shown in FIGS. 4A–4C and 5A–5C the tie-down straps 24,26 and the stabilizer bar 22 prevent the forces exerted by the kayak 112 from dislodging the vacuum cups 28,30. The wheels 18,20 have rubber treads 126,128 which prevent damage to the kayak 112.

When it is desired to remove the loader 10 from the automobile, upward pressure by a user on the operating bar 100 in the direction of the arrow 130 in FIG. 1 allows air to enter the vacuum cups 28,30 thereby breaking the partial vacuum in the vacuum cups 28,30 and releasing the loader 10.

The foregoing specific embodiments of the present invention as set forth in the specification herein are for illustrative purposes only. Various deviations and modifications can be made within the spirit and scope of this invention, without departing from the main theme thereof.

What is claimed is:

1. A loader apparatus for mounting equipment onto the roof of an automobile comprising:
    a support frame;
    a pair of vacuum cups mounted on said support frame;
    an axle mounted on said support frame, with said axle having a central portion, a first end and a second end;
    a pair of wheels rotatably mounted one each on said first end and on said second end of said axle;
    a pair of straps each having a first end connected to said axle and a second end;
    a pair of clips connected, one each, to said second ends of said straps.

2. The loader apparatus as claimed in claim 1 in which each of said wheels comprises:
    a rubber tread portion.

3. The loader apparatus as claimed in claim 1 in which each of said clips has a first portion and a second portion with said first and said second portions having an angular relationship.

4. The loader apparatus as claimed in claim 1 further comprising a stabilizer bar having a first end, a second end and an intermediate portion, with said first end attached to said central portion of said axle.

5. The loader apparatus as claimed in claim 4 further comprising:
    a bumper mounted on said second end of said stabilizer bar.

6. The loader apparatus as claimed in claim 1 in which said stabilizer bar is of extended length and in which said stabilizer bar comprises:
    a bent portion formed on said intermediate portion of said stabilizer bar thereby forming a relatively longer segment and a relatively shorter segment.

7. The loader apparatus as claimed in claim 6 in which said relatively longer segment is disposed proximate to said axle and said relatively longer segment and said relatively shorter segment mutually form an obtuse angle.

8. The loader apparatus as claimed in claim 1 further comprising:
    a pair of spacers mounted on said axle with one of said spacers disposed proximate to each said wheel.

9. The loader apparatus as claimed in claim 8 in which said pair of spacers are rotatably mounted on said axle.

10. The loader apparatus as claimed in claim 8, further comprising:

foam layer covering each of said spacers.

11. The loader apparatus as claimed in claim 8 further comprising:

a pair of washers disposed, one each, between said wheels and said spacers.

12. The loader apparatus as claimed in claim 8 in which said straps are connected to said spacers.

* * * * *